United States Patent

[11] 3,624,586

[72] Inventor Frederick T. Inacker
Dallas, Tex.

[21] Appl. No. 9,611
[22] Filed Feb. 9, 1970
[45] Patented Nov. 30, 1971
[73] Assignee Ammon & Champion Company, Inc.
Dallas, Tex.

[54] INTEGRATED CIRCUIT CONNECTOR SYSTEM
19 Claims, 5 Drawing Figs.

[52] U.S. Cl. .......... 339/17 CF, 174/DIG. 3, 317/101 CP, 339/75 MP, 339/176 MP
[51] Int. Cl. .......... H01l 1/14, H02b 9/00, H05k 7/08
[50] Field of Search .......... 317/100, 101; 174/DIG. 3, 68.5; 339/17, 75, 176, 36

[56] References Cited

UNITED STATES PATENTS

| | | | |
|---|---|---|---|
| 3,173,732 | 3/1965 | James | 339/17 |
| 3,192,445 | 6/1965 | Evans et al. | 317/101 C |
| 3,311,790 | 3/1967 | Vizzier, Jr. et al. | 317/100 |
| 3,441,853 | 4/1969 | Bodine | 339/36 |
| 3,447,040 | 5/1969 | Denton, Jr. | 317/101 CC |
| 3,480,902 | 11/1969 | Barnes et al. | 339/17 CF |
| 3,530,422 | 9/1970 | Goodman | 339/176 MP X |

OTHER REFERENCES

Augat, Inc. Catalog Number 266, " High Density Dual-In-Line Packaging Panels Designed for Automatic Wire-Wrapping," published in Electronic Design, Aug. 2, 1967, Volume 15, No. 16, pertinent page is pg. 5 of said catalog; found in 174–F.P.

*Primary Examiner*—Marvin A. Champion
*Assistant Examiner*—Terrell P. Lewis
*Attorney*—Richards, Harris & Hubbard

ABSTRACT: A plurality of insulative strips having recessed contact-receiving grooves formed in opposite sides are mounted upon the upper face of an insulative mounting board parallel to one another to define spaced areas therebetween. A metal contact is mounted with a connector portion lying within each one of the contact-receiving grooves of the insulative strips and with the shank portion extending through to the underside of the insulative mounting board. The contact-receiving grooves are spaced from one another at a distance to grip the leads of a dual in-line integrated circuit package. Integrated circuit packages are inverted and inserted down into the space between the insulative strips so that the conductive leads of the packages contact the connector portion of the contacts lying within the grooves. The contacts on opposite sides of the strips are in conductive engagement with the leads of different packages. Adjacent insulative strips are so spaced from one another that the integrated circuit devices are held within the mounting areas by firm frictional engagement between t' leads and the contacts.

INVENTOR:
FREDERICK T. INACKER

Richards, Harris & Hubbard
ATTORNEYS

INTEGRATED CIRCUIT CONNECTOR SYSTEM

BACKGROUND OF THE INVENTION

1. Field of the Invention

The invention relates to connectors for integrated circuit devices, and more particularly, to a connector system for rapidly mounting and connecting a plurality of integrated circuit devices in a compact array.

2. History of the Prior Art

In the past, the principal manner in which integrated circuit devices such as dual in-line packages (DIP) have been mounted and connected has been with conventional sockets. These sockets generally include a plastic housing having receiving holes containing socket terminals which are in alignment with the leads on the device to be connected. The sockets are constructed much like conventional octal pin sockets used for mounting vacuum tubes. Integrated circuit connector sockets provide relatively inefficient utilization of mounting space, require a substantial height of mounting area, and do not always provide solid electrical contact with each one of the leads of the integrated circuit package.

One solution which has been proposed to the problems presented by the socket type of integrated circuit connector is that of connectors formed of an insulating block having a recessed channel formed therein with conductive connector portions along opposite walls of the channel. The connector is constructed so that when an integrated circuit device is inverted and inserted into the channel, there is a frictional fit between the lead contacts of the integrated circuit and the conductive connectors on the walls of the channel. This type of connector, however, possesses many of the disadvantages inherent in the socket connector. For example, the channel connector system makes relatively inefficient use of integrated circuit mounting space, since one entire connector block strip is required for each row of integrated circuit packages to be mounted.

SUMMARY OF THE INVENTION

The invention relates to an integrated circuit connector system employing a single insulator strip located between pairs of electrical contacts, which contacts are termination connections for different integrated circuit devices. A plurality of insulative strips are mounted spaced from one another to form parallel receiving portions for a plurality of integrated circuit devices. More particularly, on one embodiment, a connector system for a pair of integrated circuit devices having leads extending therefrom is shown which includes an insulative mounting board having an insulative strip mounted to extend perpendicular to the board. Conductive contacts are positioned along opposite sides of the strip so that the contacts along one side are arranged for engagement with the leads of one of the pair of integrated circuit devices and the contacts along the other side are arranged for engagement with the lead of the other side of the pair of integrated circuit devices.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figures 1, 2, 3:
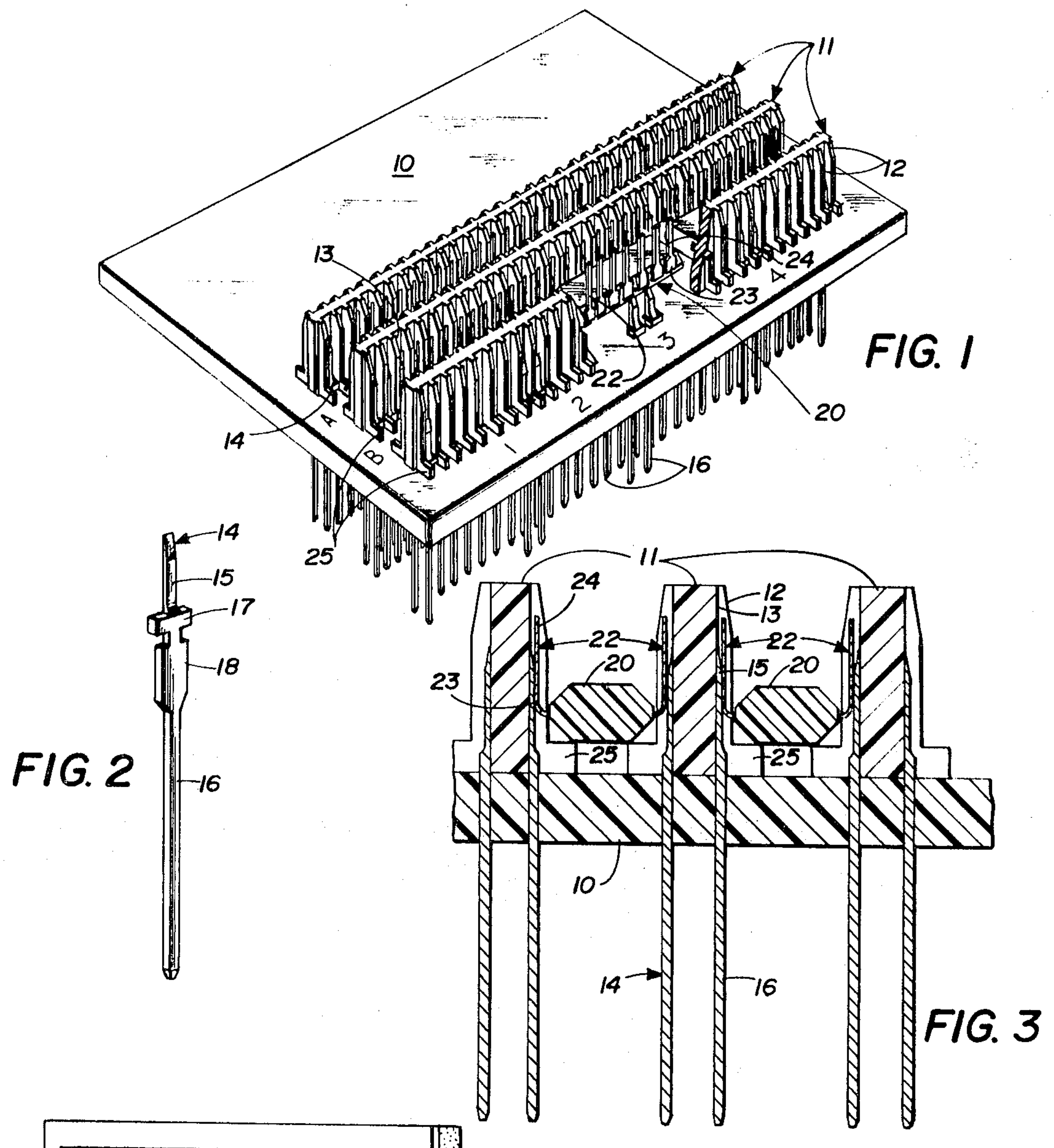
FIG. 1 is a perspective view of an integrated circuit connector device, a section of one of the insulative strips having been cut away to show the manner in which an integrated circuit device is mounted and terminated.
FIG. 2 is a perspective view of one of the conductive contacts used in the system.
FIG. 3 is a cross-sectional view of three of the insulative strips of FIG. 1 showing the conductive mounting connectors associated therewith.

Referring to FIG. 1, the integrated circuit connector system of the present invention includes an insulative mounting board 10 onto which are mounted a plurality of insulative strips 11—11 which extend perpendicular to the board. The mounting board 10 is preferably formed of a single sheet of an insulative material such as fiberglass or compressed, resin impregnated fibers. The insulative strips 11—11 are preferably molded of a slightly flexible, thermoplastic insulative material such as nylon or a glass-filled polycarbonate. Each one of the strips 11 includes a central body having ribs 12—12 formed across the width thereof. The ribs on opposite sides of the strip 11 are aligned with one another so as to form opposed and aligned recessed grooves 13—13 which extend perpendicular to the surface of the board 10. Each of the strips 11—11 is mounted to the board 10 parallel to one another and the grooves 13—13 of adjacent strips are positioned on the strips so that each one of the grooves is aligned with a corresponding groove on the adjacent strip.

The strips 11—11 are attached to the board 10 in the following manner. A plurality of holes are first drilled or punched in the board 10 and then conductive metal contacts 14—14 are force fitted into the holes ro form adjacent rows. As shown in FIG. 3, there are six rows of contacts forming three pairs of contact rows, each one of the pairs of rows being spaced about the same distance as the thickness of the grooves 13—13 of the insulative strips 11—11. When the contact rows are in place, a strip 11 is then pressed down between each one of the three pairs of contact rows. Each one of the insulative strips 11 is then held in place and mounted to the board 10 by functional engagement of each of the contacts 14—14 within the grooves 13—13.

When the contacts and insulative strips are both in place on the board 10, a conductive metal contact 14 lies in each one of the grooves 13—13 on the side of a strip which faces an adjacent strip. Referring to FIG. 2, a metal contact 14 comprises a connector portion 15 and a shank portion 16 which are separated by a shoulder 17 and an enlarged neck section 18, which is greater in width than the shank. The contact-receiving holes in the board 10 are slightly larger than the shank portion 16 so that a contact will readily pass into a mounting hole. The neck section 18 is enlarged to such a width that when the contact is pressfit down into a hole there is a snug rigid engagement between the neck section and the walls of the hole. The shoulder 17 limits the depth to which a contact 14 may be pressed into the board. The shank portion 16 of the contact 14 is substantially square in cross section as is required to permit termination by such techniques as wire wrapping. The connector portion 15 of the contact is preferably recessed from one surface of the contact by coining so that when the connector is assembled there will be proper spacing between opposed contacts to properly receive an integrated circuit device between them. The upper end of the connector portion 15 of the contact 14 is slightly beveled so that the resilient leads of an integrated circuit device are readily flexed as the device is inserted between opposed contacts of the connector.

Referring again to FIG. 1, the connector portions of the contacts 14 fill a portion of each one of the grooves 13—13 and the shank portion of each extends through a hole in the mounting board 10 so that electrical connection can be made to the shank by a terminating technique, such as wire wrapping. The strips 11—11 are held in place and mounted to the board 10 by the conductive contacts 14 lying on opposite sides of each strip. The two outermost ones of the strips 11—11 may be held in place on the outer faces by only a few contacts and need not necessarily be filled in every groove.

Adjacent ones of the strips 11—11 are spaced from one another in appropriate width to receive between the strips a dual in-line package (DIP) integrated circuit device 20. Each one of the devices 20 to be terminated and mounted by the connector includes a molded body portion 21 and a plurality of extending leads 22—22. Each of the leads 22 include a broad base section 23 near the body of the device and a slender wirelike section 24. A device 18 is mounted by positioning it with the leads 20—20 so that the leads move into the groove 13—13 and into electrical and mechanical engagement with the contacts 14—14 lying therein.

Referring now to FIG. 3, a cross-sectional view of the connector system of FIG. 1 is shown which includes the board 10 and the insulative strips 11—11, each of which has ribs 12 and recessed grooves 13. Each of the conductive contacts 14 have a connector portion 15 lying within a groove 13, a neck section 18 which has been pressfit into a hole in the board and a shank portion 16 extending from the underside of the board to provide for termination. Integrated circuit devices 20—20 are terminated by the connector system by inverting them and pressing them down into the spaces between the strips 11—11 so that the leads 22—22 are received within the grooves 13—13. The parallel grooves 13—13 serve to automatically straighten the leads of the device in the longitudinal direction as the device is inserted. This feature ensures that leads on the same side of the device will not be shorted out to one another after insertion. Once the devices 20—20 are in position between the strips 11—11, it may be seen that the devices are located entirely below the upper level of the strips so that there is no danger of dislodgement due to an accidental physical blow to the device. The board 10 acts, in effect, as the base of the "socket" for the device.

The spacing between the adjacent strips 11—11 is such that the integrated circuit devices 20—20 are wedged into position. The leads 22—22 of the integrated circuit devices 20—20 are in frictional engagement with the connector portions 15—15 of the contacts 14—14. The snug frictional contact between the leads of the devices and the contacts 14 ensures a "wiping engagement" between the conductive surface for reliable electrical connection while at the same time wedging the devices into position to prevent dislodgement. As can be seen in both FIGS. 1 and 3, the connector portions 15—15 of the contacts 14—14 are in engagement with the broad base sections 23—23 of the leads 22—22, rather than the slender wirelike portions 24—24, as is done by prior art sockets. The feature of engaging the broadest section of the lead gives better mechanical stability as well as a larger surface area of contact for a more reliable electrical circuit.

The tight fit of the devices 20—20 between the strips 11—11 ensures that the leads 22—22 receive full wiping contact along the connector portion 15 of the contacts 14 so as to remove any oxides which may have been formed thereon and ensure a good electrical connection. The wedge fit also ensures that the electrical circuit is not subject to interruption since the integrated circuit device will not be jarred loose from its lodging place by normal vibration of the circuit board. The snug engagement between the device leads 22—22 and the contacts 14—14 is obtained by proper spacing of the opposed leads and insulative strips 11—11 and the resilient, spring action of the device leads themselves. By utilizing the natural springiness of the leads 22—22 to give a good connection, it is unnecessary to provide resilience in the contact 14 as is the usual technique. The rigid connector posts 14—14 are much simpler and cheaper to manufacture than the resilient posts of the prior art.

Figure 5:
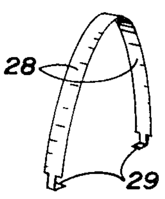
FIG. 5 is a perspective view of a tool used for removing an integrated circuit device from the connector.

As can be seen in FIGS. 1 and 3, the insulative strips 11—11 have small stepped pads 25—25 integrally formed near the bottom of each of the ribs 12—12. The pads serve to support the body of an integrated circuit device 22 above the surface of the board 10 so that there is ample airspace between the device and the board to allow for cooling and to prevent moisture entrapment. Additionally, the pads will permit both the top section of the board between the strips 11—11 and the body of an integrated circuit device to be made of conductive material and the two still not be in conductive contact. Another feature of pads 25—25 is that since the devices are supported spaced from he surface of the board 10, they are easier to remove by using a tool, such as that shown in FIG. 5. The tool has U-shaped resilient arms 28—28 which have sections 29—29 formed on the ends thereof. The hooks are inserted beneath the body of a device and the arms squeezed shut prior to lifting and removing the device.

As can be also seen in FIG. 3, one of the principal features of the present invention is that a single insulative strip has conductive contacts on opposite sides which make connection with the leads of different integrated circuit devices. This aspect of the invention allows devices to be mounted with a much more efficient utilization of mounting space. The spaces between the strips and the areas along the length of the insulative strips 11—11 are preferably marked, as is illustratively shown in FIG. 1, so as to identify the channels into which the particular integrated circuit device should be inserted for proper transverse placement so that its leads correspond with the proper contacts.

Figure 4:
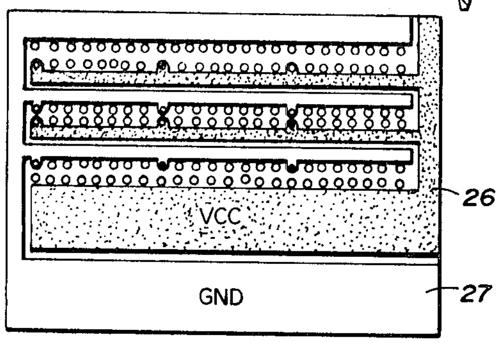
FIG. 4 is a bottom view of the integrated circuit connector system shown in FIG. 1.

Referring now to FIG. 4, there is shown the bottom portion of the circuit board 10. Printed circuit techniques are used to deposit layers of conductive material 26 and 27 which extend adjacent to certain ones of the shank portions 16 of the contacts 14. Connection may be made to a contact 14 by soldering between the contact and the conductive material.

It will be seen that there is provided a connector system for integrated circuit devices having leads extending therefrom which includes an insulative mounting board having a plurality of insulative strips mounted upon and extending perpendicular to the surface of the board. Each strip is spaced from each adjacent strip a distance slightly greater than the width of said circuit devices to be mounted. Each of the strips has grooves formed in opposite sides thereof which extend perpendicular to the board. A conductive contact is positioned in selected ones of the grooves in the strips and extends through to the underside of the board to hold the strips in position and provide a terminal connection. The contacts are placed into electrical engagement with the leads of an integrated circuit device when the device is pressed fitted between two adjacent strips.

Although preferred embodiments of the invention have been described in detail, it is to be understood that various changes, substitutions, and alterations can be made therein without departing from the spirit and scope of the invention as defined by the appended claims.

What is claimed is:

1. A connector system for a pair of integrated circuit devices having leads extending therefrom comprising:
- an insulative mounting board;
- an insulative strip mounted to extend perpendicular to said board;
- a row of conductive contacts positioned along opposite sides of each strip, each contact lying flat against a surface of said strip, the contacts along one side being arranged for engagement with the leads of one side of one of said pair of integrated circuit devices and the contacts along the other side being arranged for engagement with the leads of one side of the other of said pair of integrated circuit devices, said insulative strip lying between and separating the two devices comprising said pair along said contact rows.

2. A connector system as set forth in claim 1 wherein said insulative strip has grooves formed therein which grooves extend perpendicular to said board and are spaced from one another the same distances as the leads of said devices are spaced from one another and wherein said conductive contacts lie within said grooves between the leads of said devices and said insulative strip.

3. A connector system for a pair of rows of integrated circuit devices having leads extending therefrom comprising:
- an insulative mounting board;
- an insulative strip mounted to extend perpendicular to said board;
- a row of conductive contacts positioned along opposite sides of each strip, each contact lying flat against a surface of said strip, the contacts along one side being arranged for engagement with the leads of one side of one row of said integrated circuit devices and the contacts along the other side being arranged for engagement with the leads of one side of the other row of said integrated circuit devices, said insulative strip lying between and separating the two rows of devices along said contact rows.

4. A connector system as set forth in claim 3 wherein said insulative strip has a plurality of ribs formed thereon to define a groove between adjacent ones of the ribs, which grooves extend perpendicular to said board and are spaced form one another the same distances as the leads of said devices are spaced from one another and wherein said conductive contacts lie within said grooves between the leads of said devices and said insulative strip.

5. A connector system as set forth in claim 4 wherein said insulative strip has a stepped pad section formed integrally with selected ones of said ribs to receive and support the body of a device in a position spaced from the surface of said board.

6. A connector system for integrated circuit devices having leads extending therefrom parallel to one another in two rows spaced a preselected distance apart from opposite sides of each device, which leads are resilient in their transverse direction comprising:

an insulative mounting board;

a plurality of insulative strips mounted upon and extending perpendicular to the surface of said board, said strips having grooves formed in opposite sides thereof which grooves extend perpendicular to said board; and a conductive contact rigidly positioned in selected ones of the grooves in said strips to form contact rows extending through to the underside of said board for holding said strips in position and providing terminal connections, each contact row being spaced from the adjacent contact row of the next adjacent parallel insulative strip a distance slightly less than the preselected distance between lead rows of an integrated circuit device, said contacts being held in electrical engagement with the leads of an integrated circuit device by the transverse resilience of the leads when the device is placed between two adjacent strips.

7. A connector system as set forth in claim 6 wherein contacts are located in every groove of the side of a strip which faces an adjacent parallel strip.

8. A connector system as set forth in claim 7 wherein said board is marked to define the proper transverse placement of integrated circuit devices between said strips.

9. A connector system as set forth in claim 6 wherein said strips have stepped pads formed between said grooves and adjacent said board, said pads being of a width and height to support the body of a device in a position spaced from the surface of said board.

10. A connector system as set forth in claim 6 wherein said contacts extend through holes in said board arranged in parallel adjacent rows spaced from one another a distance approximately equal to the width of the insulative strip and each of said conductive contacts comprise:

a connector portion received within a groove in said strips;

a shank portion extending through a hole in the surface of the board to provide an electrical terminal, said shank portion being smaller than the hole to allow the shank to be dropped through said hole; and a neck section between the shank portion and the connector portion, said neck section being slightly greater in width than the hole through which the contact extends to be received within the hole by a press fit.

11. A connector system as set forth in claim 10 wherein each of said contacts also includes a shoulder between said neck section and said connector portion to limit the distance which a contact is press fit into a hole within the board.

12. A connector system as set forth in claim 10 wherein the face of the connector portion to be placed into engagement with a lead of a circuit device is recessed.

13. A connector system as set forth in claim 6 having printed circuit paths on the underside of said board to permit electrical connection with the conductive contacts.

14. A connector system as set forth in claim 13 wherein said insulative strip has grooves formed therein which grooves extend perpendicular to said board and are spaced from one another the same distances as the leads of said devices are spaced from one another and wherein said conductive contacts lie within said grooves.

15. A connector system as set forth in claim 14 wherein said strip has stepped pad portions formed between said grooves and near said board, said pads being of a height and width to support a device spaced from the surface of said board.

16. A connector system as set forth in claim 14 wherein said contacts extend through a hole in said board and each of said conductive contacts comprise:

a connector portion received within a groove in said strips;

a shank portion extending through a hole in the surface of the board to provide an electrical terminal, said shank portion being smaller than the hole to allow the shank to be dropped through said hole; and a neck section between the shank portion and the connector portion, said neck section being slightly greater in width than the hole through which the contact extends to be received within the hole by a press fit.

17. A connector system as set forth in claim 16 wherein each of said contacts also includes a shoulder between said neck section and said connector portion to limit the distance which a contact is press fit into a hole within the board.

18. A connector system as set forth in claim 16 wherein the face of the connector portion to be placed into engagement with a lead of a circuit device is recessed.

19. A connector system for a rectangular integrated circuit device having a plurality of leads extending outwardly from the said device and then downwardly, said leads being resilient in the transverse direction said connector comprising:

an insulative mounting board, said board having four parallel rows of holes therein, said holes forming a pair of two different sets of rows, the two innermost rows being spaced from one another a distance approximately equal to the width of an integrated circuit device to be connected and the two outermost rows being spaced a preestablished distance from the respective adjacent rows in each set;

a plurality of rigid conductive contacts extending through the holes in said board to form a pair of two different sets of rows of contacts; and a pair of insulative strips, one of said strips being inserted between one of said sets of rows of said contacts and the other of said strips being inserted between the other of said sets of rows of contacts, said preestablished distance between rows of contacts being such that the strips are held in position by frictional engagement with said adjacent rows of contacts, the leads of an integrated circuit device being held in position between the two innermost rows of contacts due to frictional engagement between the rigid contacts and the transversely resilient, downwardly extending leads of a device, said board forming the base of said connector.

* * * * *